United States Patent
Hadar et al.

(10) Patent No.: US 10,615,603 B2
(45) Date of Patent: Apr. 7, 2020

(54) SYSTEMS AND METHODS TO BALANCE SOLAR PANELS IN A MULTI-PANEL SYSTEM

(71) Applicant: Tigo Energy, Inc., Los Gatos, CA (US)

(72) Inventors: Ron Hadar, Cupertino, CA (US); Shmuel Arditi, Discovery Bay, CA (US)

(73) Assignee: Tigo Energy, Inc., Los Gatos, CA (US)

( * ) Notice: Subject to any disclaimer, the term of this patent is extended or adjusted under 35 U.S.C. 154(b) by 0 days.

(21) Appl. No.: 16/161,987

(22) Filed: Oct. 16, 2018

(65) Prior Publication Data

US 2019/0081482 A1 Mar. 14, 2019

Related U.S. Application Data

(60) Division of application No. 14/512,786, filed on Oct. 13, 2014, now Pat. No. 10,110,007, which is a
(Continued)

(51) Int. Cl.
*H02J 3/38* (2006.01)

(52) U.S. Cl.
CPC ............... *H02J 3/38* (2013.01); *H02J 3/385* (2013.01); *Y02E 10/58* (2013.01); *Y10T 307/313* (2015.04);
(Continued)

(58) Field of Classification Search
CPC ... H02J 3/383; H02J 3/385; H02J 3/38; Y02E 10/58; Y10T 307/696; Y10T 307/32; Y10T 307/685; Y10T 307/313
See application file for complete search history.

(56) References Cited

U.S. PATENT DOCUMENTS

| | | |
|---|---|---|
| 3,696,286 A | 10/1972 | Ule |
| 4,580,090 A | 4/1986 | Bailey et al. |

(Continued)

FOREIGN PATENT DOCUMENTS

| | | |
|---|---|---|
| AU | 2005262278 | 7/2005 |
| DE | 4232356 | 3/1994 |

(Continued)

OTHER PUBLICATIONS

Alonso, R. et al., "A New Distributed Converter Interface for PV Panels," 20th European Photovoltaic Solar Energy Conference, Barcelona, Spain, pp. 2288-2291, Jun. 6-10, 2005.

(Continued)

*Primary Examiner* — Daniel Kessie
(74) *Attorney, Agent, or Firm* — Greenberg Traurig

(57) ABSTRACT

Systems and methods to balance currents among a plurality of photovoltaic units connected in series. In aspect, a management unit is coupled between a photovoltaic energy production unit and a string of energy production units. The management unit has an energy storage element (e.g., a capacitor) connected to the photovoltaic energy production unit. The management unit further has a switch to selectively couple to the energy storage element and the photovoltaic energy production unit to the string. The management unit allows the current in the string to be larger than the current in the photovoltaic energy production unit.

20 Claims, 8 Drawing Sheets

Related U.S. Application Data continuation of application No. 12/567,169, filed on Sep. 25, 2009, now Pat. No. 8,860,246, which is a continuation of application No. 12/411,317, filed on Mar. 25, 2009, now Pat. No. 7,602,080.

(60) Provisional application No. 61/200,601, filed on Dec. 2, 2008, provisional application No. 61/200,279, filed on Nov. 26, 2008.

(52) U.S. Cl.
CPC .......... *Y10T 307/32* (2015.04); *Y10T 307/685* (2015.04); *Y10T 307/696* (2015.04)

(56) References Cited

U.S. PATENT DOCUMENTS

| | | |
|---|---|---|
| 4,604,567 A | 8/1986 | Chetty |
| 4,873,480 A | 10/1989 | Lafferty |
| 5,027,051 A | 6/1991 | Lafferty |
| 5,144,222 A | 9/1992 | Herbert |
| 5,235,266 A | 8/1993 | Schaffrin |
| 5,268,832 A | 12/1993 | Kandatsu |
| 5,327,071 A | 7/1994 | Frederick et al. |
| 5,504,418 A | 4/1996 | Ashley |
| 5,604,430 A | 2/1997 | Decker et al. |
| 5,648,731 A | 7/1997 | Decker et al. |
| 5,747,967 A | 5/1998 | Muljadi et al. |
| 5,923,158 A | 7/1999 | Kurokami et al. |
| 5,932,994 A | 8/1999 | Jo et al. |
| 6,275,016 B1 | 8/2001 | Ivanov |
| 6,448,489 B2 | 9/2002 | Kimura et al. |
| 6,650,031 B1 | 11/2003 | Goldack |
| 6,844,739 B2 | 1/2005 | Kasai et al. |
| 6,894,911 B2 | 5/2005 | Telefus et al. |
| 6,919,714 B2 | 7/2005 | Delepaut |
| 6,984,970 B2 | 1/2006 | Capel |
| 6,987,444 B2 | 1/2006 | Bub et al. |
| 7,061,214 B2 | 6/2006 | Mayega et al. |
| 7,068,017 B2 | 6/2006 | Milner et al. |
| 7,248,946 B2 | 7/2007 | Bashaw et al. |
| 7,256,566 B2 | 8/2007 | Bhavaraju et al. |
| 7,259,474 B2 | 8/2007 | Blanc |
| 7,276,886 B2 | 10/2007 | Kinder et al. |
| 7,336,004 B2 | 2/2008 | Lai |
| 7,378,820 B2 | 5/2008 | Liu |
| 7,394,237 B2 | 7/2008 | Chou et al. |
| 7,462,955 B2 | 12/2008 | McNamara et al. |
| 7,518,266 B2 | 4/2009 | Eckroad |
| 7,518,346 B2 | 4/2009 | Prexl et al. |
| 7,538,451 B2 | 5/2009 | Nomoto |
| 7,545,053 B2 | 6/2009 | Yoshikawa et al. |
| 7,560,906 B2 | 7/2009 | Liu |
| 7,595,616 B2 | 9/2009 | Prexl et al. |
| 7,602,080 B1 | 10/2009 | Hadar et al. |
| 7,605,498 B2 | 10/2009 | Ledenev et al. |
| 7,719,140 B2 | 5/2010 | Ledenev et al. |
| 7,839,022 B2 | 11/2010 | Wolfs |
| 7,900,361 B2 | 3/2011 | Adest et al. |
| 8,093,757 B2 | 1/2012 | Wolfs |
| 8,102,074 B2 | 1/2012 | Hadar et al. |
| 8,274,172 B2 | 9/2012 | Hadar et al. |
| 8,860,246 B2 | 10/2014 | Hadar et al. |
| 9,644,993 B2 * | 5/2017 | Adest ............... H02J 3/385 |
| 10,110,007 B2 | 10/2018 | Hadar et al. |
| 2001/0038277 A1 | 11/2001 | Burstein et al. |
| 2004/0223351 A1 | 11/2004 | Kurokami et al. |
| 2005/0057214 A1 | 3/2005 | Matan |
| 2005/0057215 A1 | 3/2005 | Matan |
| 2005/0121067 A1 | 6/2005 | Toyomura et al. |
| 2005/0139258 A1 | 6/2005 | Liu et al. |
| 2005/0172995 A1 | 8/2005 | Rohrig et al. |
| 2006/0001406 A1 | 1/2006 | Matan |
| 2006/0174939 A1 | 8/2006 | Matan |
| 2006/0185727 A1 | 8/2006 | Matan |
| 2007/0019613 A1 | 1/2007 | Frezzolini |
| 2007/0211888 A1 | 9/2007 | Corcoran et al. |
| 2007/0273351 A1 | 11/2007 | Matan |
| 2008/0030305 A1 | 2/2008 | O'Connor |
| 2008/0036440 A1 | 2/2008 | Garmer |
| 2008/0097655 A1 | 4/2008 | Hadar et al. |
| 2008/0106241 A1 | 5/2008 | Deaver et al. |
| 2008/0121272 A1 | 5/2008 | Besser et al. |
| 2008/0122449 A1 | 5/2008 | Besser et al. |
| 2008/0122518 A1 | 5/2008 | Besser et al. |
| 2008/0143188 A1 | 6/2008 | Adest et al. |
| 2008/0150366 A1 | 6/2008 | Adest et al. |
| 2008/0179949 A1 | 7/2008 | Besser et al. |
| 2008/0191560 A1 | 8/2008 | Besser et al. |
| 2008/0191675 A1 | 8/2008 | Besser et al. |
| 2008/0303503 A1 | 12/2008 | Wolfs |
| 2009/0284232 A1 | 11/2009 | Zhang et al. |
| 2010/0127570 A1 | 5/2010 | Hadar et al. |
| 2010/0127571 A1 | 5/2010 | Hadar et al. |
| 2011/0025130 A1 | 2/2011 | Hadar et al. |
| 2011/0062784 A1 | 3/2011 | Wolfs |
| 2012/0119584 A1 | 5/2012 | Hadar et al. |
| 2012/0146420 A1 | 6/2012 | Wolfs |
| 2015/0028683 A1 | 1/2015 | Hadar et al. |

FOREIGN PATENT DOCUMENTS

| | | |
|---|---|---|
| DE | 19961705 | 7/2001 |
| DE | 10136147 | 2/2003 |
| EP | 0178757 | 4/1986 |
| EP | 1388774 | 2/2004 |
| ES | 2249147 | 3/2006 |
| JP | 07016552 | 3/1995 |
| JP | 11046457 | 2/1999 |
| JP | 11103538 | 4/1999 |
| JP | 2000166097 | 4/2008 |
| WO | 2003012569 | 2/2003 |
| WO | 2005069096 | 7/2005 |
| WO | 2005112551 | 12/2005 |
| WO | 2006005125 | 1/2006 |
| WO | 2010062662 | 6/2008 |
| WO | 2008097591 | 8/2008 |
| WO | 2008125915 | 10/2008 |
| WO | 2008132553 | 11/2008 |

OTHER PUBLICATIONS

Alonso, R. et al., "Experimental Results of Intelligent PV Module for Grid-Connected PV Systems," 21st European Photovoltaic Solar Energy Conference, Dresden, Germany, pp. 2297-2300, Sep. 4-8, 2006.

Boostbuck.com, "The Four Boostbuck Topologies," located at http://www.boostbuck.com/TheFourTopologies.html, 2003.

European Patent Application No. 09829487.9, Extended Search Report, dated Apr. 21, 2011.

Gautam, Nalin K. et al., "An Efficient Algorithm to Simulate the Electrical Performance of Solar Photovoltaic Arrays," Energy, vol. 27, No. 4, pp. 347-361, 2002.

International Patent Application No. PCT/AU2005/001017, International Search Report and Written Opinion, dated Aug. 18, 2005.

International Patent Application No. PCT/US2009/047734, International Search Report & Written Opinion, dated May 4, 2010.

International Patent Application No. PCT/US2009/062536, International Search Report & Written Opinion, dated Jun. 17, 2010.

International Patent Application No. PCT/US2010/029915, International Search Report and Written Opinion, dated Oct. 21, 2010.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

(56) References Cited

OTHER PUBLICATIONS

Palma, L. et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.
Quaschning, V. et al., "Cost Effectiveness of Shadow Tolerant Photovoltaic Systems," Euronsun 96, pp. 819-824, Sep. 16, 1996.
Uriarte, S. et al., "Energy Integrated Management System for PV Applications," 20th European Photovoltaic Solar Energy Conference, Jun. 6, 2005.
Walker, G. R. et al., "Cascaded DC-DC Converter Connection of Photovoltaic Modules," 33rd IEEE Power Electronics Specialists Conference (PESC'02), vol. 1, pp. 24-29, 2002.
Walker, Geoffrey R. et al., "Cascaded DC-DC Converter Connection of Photovoltaic Modules," IEEE Transactions on Power Electronics, vol. 19, No. 4, pp. 1130-1139, Jul. 2004.
Systems and Methods to Balance Solar Panels in a Multi-panel System.
U.S. Appl. No.: 12/567,169 Filed on: Sep. 25, 2009 Inventor(s): Ron Hadar, et al Docket no. 108144-200702/US (TGY010) Examiner: Fritz Fleming Art Unit: 2836 Patent No.: 8,860,246 Issue Date: Oct. 14, 2014.
U.S. Appl. No. 14/512,786, filed Oct. 13, 2014, Ron Hadar, et al., Notice of Allowance dated Jun. 25, 2018, Application Received in Office of Publications.
Enhanced Systems and Methods for Using a Power Converter for Balancing Modules in Single-string and Multi-string Configurations, U.S. Appl. No. 15/203,595, filed Jul. 6, 2016, Shmuel Arditi, et al., Final Rejection dated Oct. 24, 2018.
Basso, Tim, "IEEE Standard for Interconnecting Distributed Resources With the Electric Power System," IEEE PES Meeting, Jun. 9, 2004.
Enslin, Johan H.R., et al., "Integrated Photovoltaic Maximum Power Point Tracking Converter," IEEE Transactions on Industrial Electronics, vol. 44, No. 6, pp. 769-773, Dec. 1997.
Roman, Eduardo, et al., "Intelligent PV Module for Grid-Connected PV Systems," IEEE Transactions on Industrial Electronics, vol. 53, No. 4, pp. 1066-1073, Aug. 2006.

\* cited by examiner

SYSTEMS AND METHODS TO BALANCE SOLAR PANELS IN A MULTI-PANEL SYSTEM

RELATED APPLICATIONS

The present application is a divisional application of U.S. patent application Ser. No. 14/512,786, filed Oct. 13, 2014, entitled "Systems and Methods to Balance Solar Panels in a Multi-Panel System", which is a continuation application of U.S. patent application Ser. No. 12/567,169, filed Sep. 25, 2009, entitled "Systems and Methods to Balance Solar Panels in a Multi-Panel System", which is a continuation application of U.S. patent application Ser. No. 12/411,317, filed Mar. 25, 2009, now U.S. Pat. No. 7,602,080, which claims the benefit of Prov. U.S. Pat. App. Ser. No. 61/200,601, filed Dec. 2, 2008 and Prov. U.S. Pat. App. Ser. No. 61/200,279, filed Nov. 26, 2008, the entire disclosures of which applications are hereby incorporated herein by reference.

FIELD OF THE TECHNOLOGY

At least some embodiments of the disclosure relate to photovoltaic systems in general, and more particularly but not limited to, improving the energy production performance of photovoltaic systems.

BACKGROUND

Solar system installers take a large guard band (or safety margin) to make sure the voltages don't cross the 600V or 1000V limits in the United States and the European Union, respectively. That limitation inhibits them from installing more solar panel modules, often referred to as "modules" or "panels," in series to reduce the cost of combiner boxes or string inverters. When solar modules are connected in series or in mesh configurations, there can be a problem in which weaker modules not only produce less energy but also affect other modules' capabilities to deliver energy in the same string or wiring section.

SUMMARY OF THE DESCRIPTION

Systems and methods to balance currents among a plurality of photovoltaic units connected in series are described herein. Some embodiments are summarized in this section.

In one aspect, an apparatus includes: a photovoltaic energy production unit to generate electricity; and a management unit coupled between the photovoltaic energy production unit and a series connection of energy production units. The management unit has at least a first switch, via which the photovoltaic energy production unit generating a first current is to provide electricity to the series connection of energy production units. The management unit is configured to allow a second current, larger than the first current, to flow through the series connection of energy production units.

In one embodiment, the energy production unit is at least one solar cell of a solar panel; and the management unit has no inductor and is integrated on the solar panel. For example, the energy production unit may be a subset of photovoltaic cells in a string on a solar panel, or the entire set of photovoltaic cells of a solar panel.

In one embodiment, the management unit further includes an energy storage unit connected to the photovoltaic energy production unit. When the first switch is turned on, the energy production unit provides the first current to the series connection of energy production units, the energy storage unit provides a third current, and the second current in the series connection is equal to or larger than a sum of the first current and the third current. When the first switch is turned off, the energy production unit and the energy storage unit are electronically disconnected from the series connection of energy production units, and the management unit provides at least one path for the series connection of energy production units.

In one embodiment, the energy storage unit includes a capacitor coupled in parallel with the energy production unit. When the first switch is turned on, an output voltage of the local management unit is substantially equal to an output voltage of the energy production unit.

In one embodiment, the at least one path includes at least one of: a diode, a second switch that is turned off when the first switch is turned on, and a synchronous rectifier.

In one embodiment, the management unit further includes a controller to control the first switch according to a duty cycle and/or at least one of: a phase shift, and a synchronization pulse. The controller may be configured to control the first switch based on one of: at least one operating parameter (e.g., current, voltage, and temperature) associated with the energy production unit, at least one operating parameter (e.g., current, voltage, and temperature) of a separate energy production unit, and a control signal received from a remote unit (e.g., duty cycle, phase, voltage, power).

In one embodiment, the duty cycle is determined based on a maximum power point of the energy production unit, based on a maximum current of the energy production unit, based on a voltage ratio relative to the strongest unit on the string, based on a power ratio relative to the strongest unit on the string, based on a maximum power point voltage ratio relative to the strongest unit on the string, and/or based on a maximum power point power ratio relative to the strongest unit on the string.

In one embodiment, the management unit is a first management unit and the photovoltaic energy production unit is a first photovoltaic energy production unit; and the apparatus further includes: a second management unit and a second photovoltaic energy production unit. The second management unit is connected to the first management unit in series. The second management unit has at least a second switch. The second photovoltaic energy production unit is to provide electricity to the series connection of energy production units via the second switch of the second management unit. The second management unit is to allow the second current, larger than a current from the second photovoltaic energy production unit, to flow through the series connection of energy production units.

In another aspect, a method includes: providing a management unit having a first switch to couple a solar energy production unit to a series connection of energy production units; and determining at least one parameter to control the first switch. The management unit has an energy storage unit coupled to the solar energy production unit. When the first switch is turned on, the solar energy production unit provides a first current to the series connection of energy production units, the energy storage unit provides a second current, and a third current in the series connection of energy production units is equal to or larger than a sum of the first current and the second current. When the first switch is turned off, the solar energy production unit and the energy storage unit are disconnected from the series connection of energy production units, and the management unit provides at least one path for the series connection of energy production units.

In one embodiment, the determining of the parameter includes computing a duty cycle to control the first switch based on at least one operating parameter of the solar energy production unit.

In one embodiment, the at least one operating parameter includes an operating voltage of the solar energy production unit; and the method further includes: receiving operating voltages of a plurality of solar energy production units that are connected in series via a plurality of management units respectively; and identifying a first voltage among the operating voltages. The duty cycle is then computed according to a function of the first voltage and the operating voltage of the solar energy production unit.

In one embodiment, the solar energy production unit is a first solar energy production unit of the plurality of solar energy production units; and when a second solar energy production unit of the plurality of solar energy production units provides a highest power among the plurality of solar energy production units, the first voltage is an operating voltage of the second solar energy production unit, and the duty cycle is based at least in part on a ratio between the operating voltages of the first and second solar energy production units.

In one embodiment, the method further includes: adjusting the duty cycle until a decrease in the operating voltage of the second solar energy production unit is detected; and undoing an adjustment to the duty cycle that causes the decrease.

In another embodiment, the method further includes: adjusting the duty cycle until a decrease in the operating voltage of the second solar energy production unit is detected; and in response to the decrease, decreasing a duty cycle for a local management unit coupled to the second solar energy production unit to increase the operating voltage of the second solar energy production unit. In one embodiment, the duty cycle for the second solar energy production unit is decreased until the operating voltage of the second solar energy production unit is maximized.

In one embodiment, the method further includes: identifying a voltage of the solar energy production unit at a maximum power point based on the at least one operating parameter; and adjusting the duty cycle to change an operating voltage of the solar energy production unit towards the voltage at the maximum power point.

In one embodiment, the solar energy production unit is a first solar energy production unit of the plurality of solar energy production units; and the method further includes: receiving operating parameters of a plurality of solar energy production units connected in series; identifying a first maximum power point voltage of the first solar energy production unit based on the at least one operating parameter; identifying a second solar energy production unit having an operating voltage highest among the plurality of solar energy production units; identifying a second maximum power point voltage of the second solar energy production unit; computing a target voltage based on the first maximum power point voltage and the second maximum power point voltage; and adjusting the duty cycle to drive an operating voltage of the first solar energy production unit to the target voltage.

In one embodiment, the method further includes adjusting the duty cycle to increase the first current.

In one embodiment, the method further includes adjusting the duty cycle to change an operating voltage of the solar energy production unit to increase an output power of an entire string of solar energy production units.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

When solar modules are connected in series or mesh configuration, there can be a problem in which weaker modules not only produce less energy but also affect other modules in the same string or wiring section. By measuring one can determine that a few modules are weaker than the others in most commercially installed strings. Thus, the string is generating less power than the sum available at each module if modules were operated separately.

At least one embodiment of the present disclosure provides methods and systems to switch on and off weak modules in the string in a way that the current on the string bus from the good modules won't be affected by the weak modules.

Figure 1:
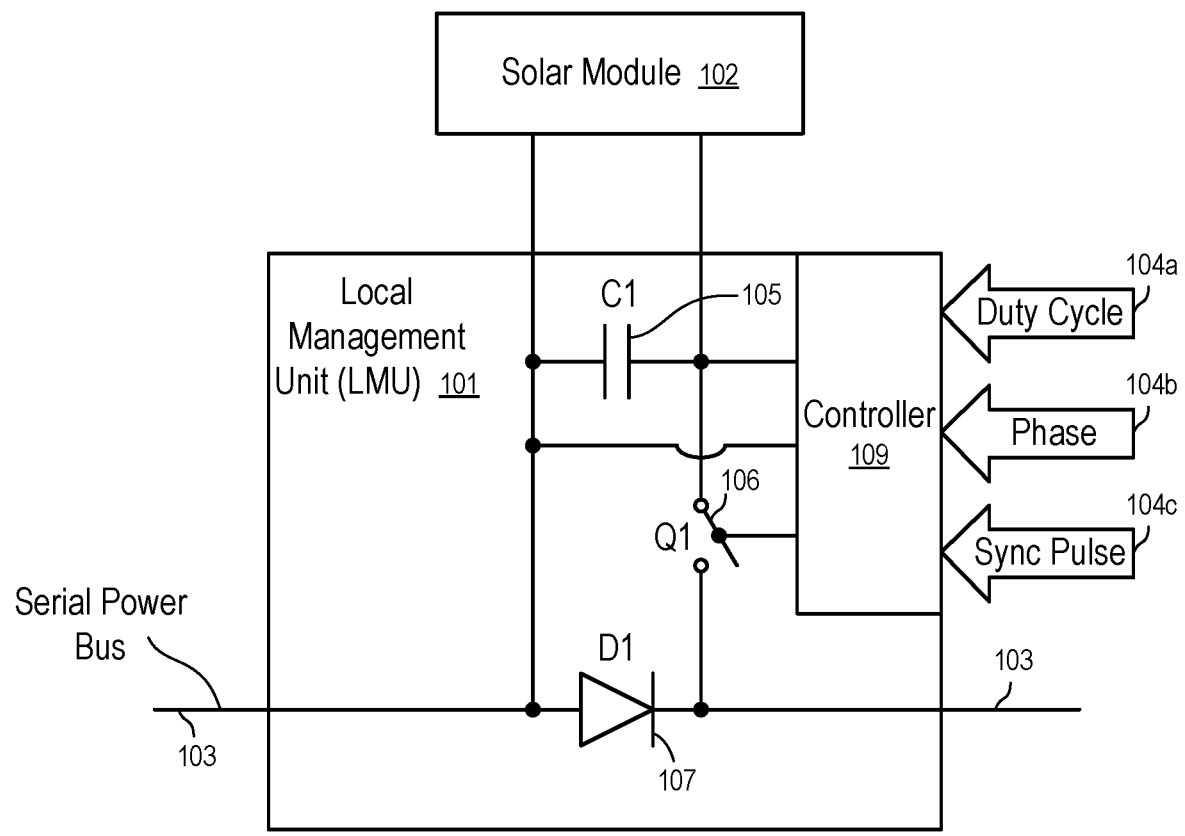
FIGS. 1-3 illustrate local management units according to some embodiments.
Figure 2:
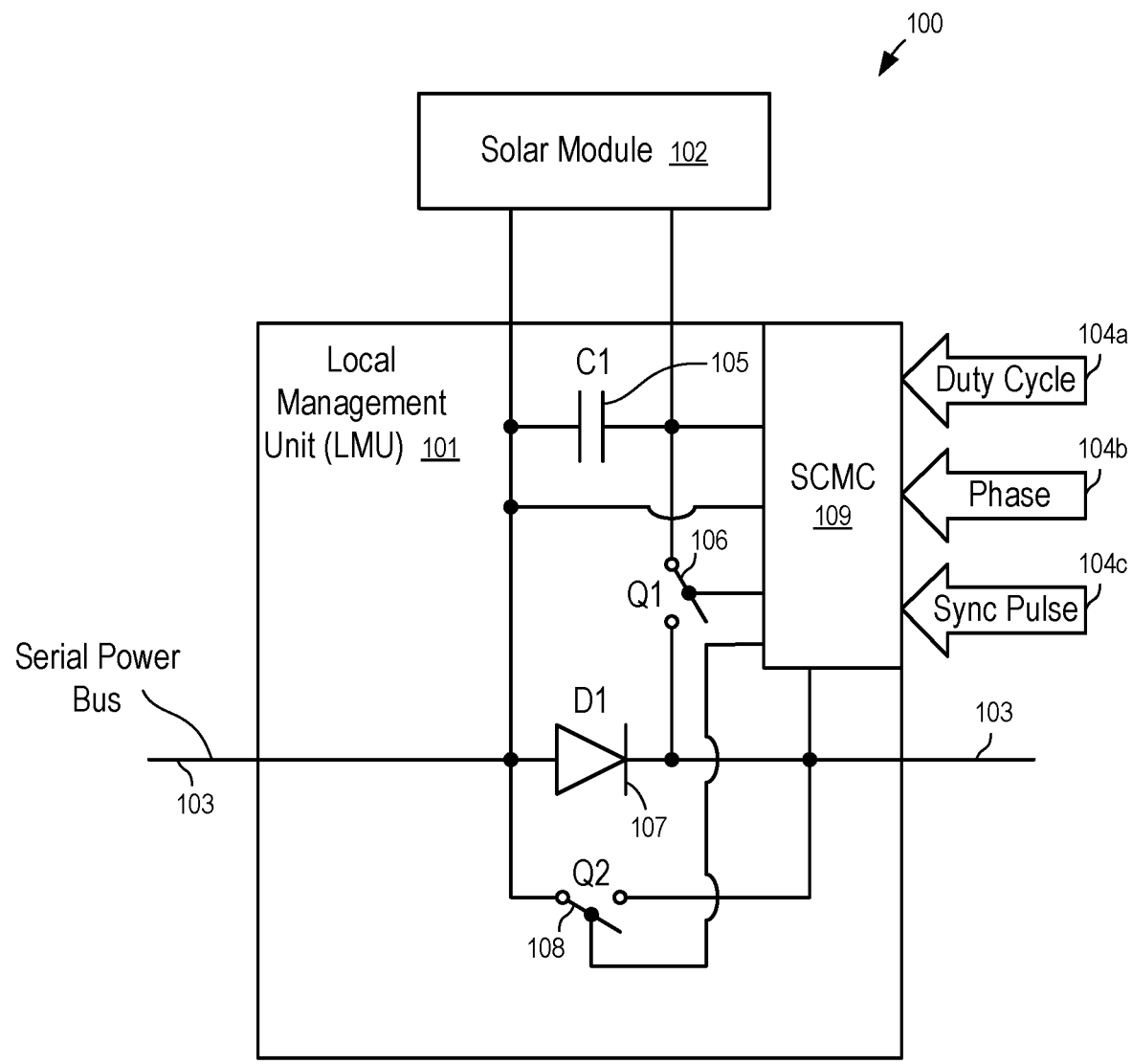
Figure 3:
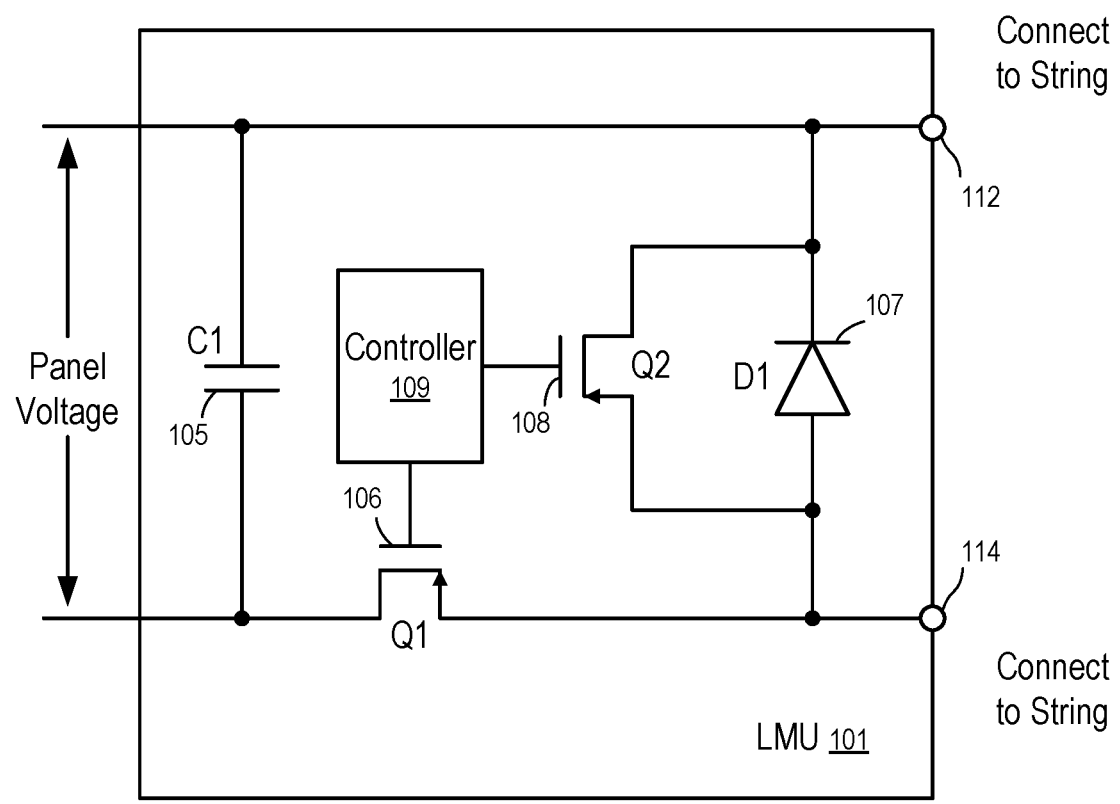

FIGS. 1-3 illustrate local management units according to some embodiments. In FIGS. 1-3, local management units (101) are used to switch on and off the solar module (102) periodically to improve the energy production performance of the photovoltaic systems connected, at least in part, in series.

In FIG. 1, a management unit (101) is local to the solar module (102) and can be used to periodically couple the solar module (102) to the serial power bus (103) via the switch Q1 (106), to improve the total power output for the string of solar modules connected to the serial power bus in series.

The local management unit (LMU) (101) may include a solar module controller to control the operation of the solar module (102) and/or a link module unit to provide connectivity to the serial power bus (103) for energy delivery and/or for data communications.

In one embodiment, the command to control the operation of the switch Q1 (106) is sent to the local management unit (101) over the photovoltaic (PV) string bus (power line) (103). Alternatively, separate network connections can be used to transmit the data and/or commands to/from the local management unit (101).

In FIGS. 1 and 2, the inputs (104a, 104b, 104c) to the local management unit (101) are illustrated separately. However, the inputs (104a, 104b, 104c) are not necessarily communicated to local management unit (101) via separate connections. In one embodiment, the inputs are received in the local management unit via the serial power bus (103).

In FIG. 1, the solar module (102) is connected in parallel to the capacitor C1 (105) of the local management unit (101). The diode D1 (107) of the local management unit (101) is connected in series in the serial power bus (103) which may or may not be part of an overall mesh configuration of solar modules. The switch Q1 (106) of the local management unit can selectively connect or disconnect the solar module (102) and the capacitor C1 (105) from a parallel connection with the diode D1 (107) and thus connect or disconnect the solar module (102) from the serial power bus (103).

In FIG. 1, a controller (109) of the local management unit (101) controls the operation of the switch (106) according to the parameters, such as duty cycle (104a), phase (104b) and synchronization pulse (104c).

In one embodiment, the controller (109) receives the parameters (104a, 104b, 104c) from a remote management unit via the serial power bus (103) or a separate data communication connection (e.g., a separate data bus or a wireless connection). In some embodiment, the controller (109) may communicate with other local management units connected on the serial power bus (103) to obtain operating parameters of the solar modules attached to the serial power bus (103) and thus compute the parameters (e.g., 104a and 104b) based on the received operating parameters. In some embodiment, the controller (109) may determine the parameter (e.g., 104a and 104b) based on the operating parameters of the solar module (102) and/or measurements obtained by the controller (109), without communicating with other local management units of other solar modules, or a remote system management unit.

In FIG. 2, a system (100) has a local management unit (101) coupled to the solar module (102). The local management unit (101) is connected between the solar module (102) and the string bus (103) to improve the total power output for the whole string on the serial power bus (103). Commands to the local management unit (101) can be sent over the photovoltaic (PV) string bus (power line) (103). To make the figure more clear, the inputs (104a, 104b, 104c) to the controller (109) of the local management unit (101) were drawn separately, which does not necessarily indicate that the inputs (104a, 104b, 104c) are provided via separate connections and/or from outside the local management unit (101). For example, in some embodiments, the controller (109) may compute the parameters (104a, 104b, 104c) based on measurements obtained at the local management unit (101), with or without data communications over the serial power bus (103) (or a separate data communication connection with other management units).

In FIG. 2, the local management unit (101) is connected in one side to the solar module (102) in parallel and on the other side in series to a string of other modules, which may or may not be part of an overall mesh configuration. The local management unit (101) may receive, among others, three inputs or types of input data, including a) requested duty cycle (104a), which can be expressed as a percentage (e.g., from 0 to 100%) of time the solar module (102) is to be connected to the serial power bus (103) via the switch Q1 (106), b) a phase shift (104b) in degrees (e.g., from 0 degree to 180 degree) and c) a timing or synchronization pulse (104c). These inputs (e.g., 104a, 104b and 104c) can be supplied as discrete signals, or can be supplied as data on a network, or composite signals sent through the power lines or wirelessly, and in yet other cases, as a combination of any of these input types.

In FIG. 2, the local management unit (101) periodically connects and disconnects the solar module (102) to and from the string that forms the serial power bus (103). The duty cycle (104a) and the phase (104b) of the operation of the switch Q1 (106) can be computed in a number of ways to improve the performance of the system, which will be discussed further below.

In FIG. 2, the local management unit (101) includes a capacitor C1 (105) and a switch Q1 (106), as well as a diode D1 (107). In FIG. 2, the diode D1 (107) is supplemented with an additional switch Q2 (108), which acts as a synchronous rectifier to increase efficiency. In one embodiment, the additional switch Q2 (108) is open (turned off) when the switch Q1 (106) is closed (turned on) to attach the solar module (102) (and the capacitor C1 (105)) to the serial power bus (103).

In some cases, a filter (not shown), including a serial coil and a parallel capacitor, is also used. The filter may be placed at the local management unit or placed just before the fuse box or inverter, or be part of either one of those.

In FIG. 2, the controller (109) is used to process the input signals (e.g., 104a, 104b, 104c) and drive the switches Q1 (106) and Q2 (108). In one embodiment, the controller (109) is a small single chip micro controller (SCMC). For example, the controller (109) may be implemented using Application-Specific Integrated Circuit (ASIC) or Field-Programmable Gate Array (FPGA). The controller (109) can even be implemented in discrete, functionally equivalent circuitry, or in other cases a combination of SCMC and discrete circuitry.

In one embodiment, the controller (109) is coupled to the solar module (102) in parallel to obtain power for processing; and the controller (109) is coupled to the serial power bus (103) to obtain signals transmitted from other management units coupled to the serial power bus (103).

By switching the module (102) (or groups of cells, or a cell) on and off to the string periodically, the local management unit (101) may lower the voltage reflected to the string bus (103) (e.g., a lower average voltage contributed to the string bus) and can cause the current reflected to the string bus (103) to be higher, nearer the level it would be if the module was not weak, generating a higher total power output.

In one embodiment, it is preferable to use different phases to operate the switches in different local management units on a string to minimize voltage variance on the string.

In FIG. 3, the local management unit (101) provides two connectors (112 and 114) for serial connections with other local management unit (101) to form a serial power bus (103). The controller (109) controls the states of the switches Q1 (106) and Q2 (108).

In FIG. 3, when the controller (109) turns on the switch (106), the panel voltage and the capacitor C1 (105) are connected in parallel to the connectors (112 and 114). The output voltage between the connectors (112 and 114) is substantially the same as the output panel voltage.

In FIG. 3, during the period the switch (106) is turned off (open), the controller (109) turns on (closes) the switch (108) to provide a path around the diode D1 (107) to improve efficiency.

In FIG. 3, when the switch (106) is turned off (open), the panel voltage charges the capacitor C1 (105), such that when the switch (106) is turned on, both the solar panel and the capacitor (105) provides currents going through the connectors (112 and 114), allowing a current larger than the current of the solar panel to flow in the string (the serial power bus (103)). When the switch (106) is turned off (open), the diode D1 (107) also provides a path between the connectors (112 and 114) to sustain the current in the string, even if the switch (108) is off for some reasons.

In one embodiment, the controller (109) is connected (not shown in FIG. 3) to the panel voltage to obtain the power for controlling the switches Q1 (106) and Q2 (108). In one embodiment, the controller (109) is further connected (not shown in FIG. 3) to at least one of the connectors to transmit and/or receive information from the string. In one embodiment, the controller (109) includes sensors (not shown in FIG. 3) to measure operating parameters of the solar panel, such as panel voltage, panel current, temperature, light intensity, etc.

Figure 4:
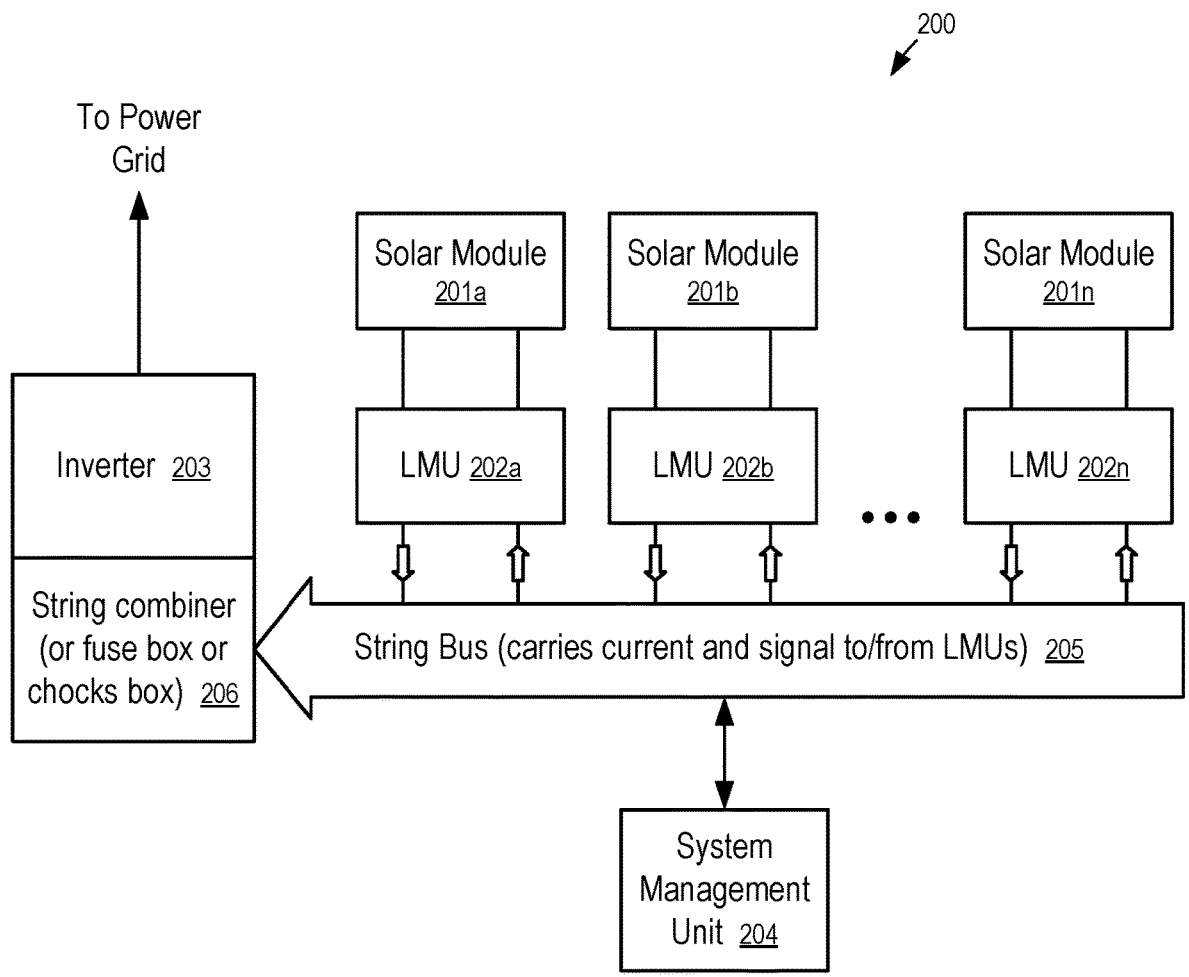
FIG. 4 illustrates a photovoltaic system according to one embodiment.

FIG. 4 illustrates a photovoltaic system (200) according to one embodiment. In FIG. 4, the photovoltaic system 200 is built from a few components, including photovoltaic modules (201a, 201b, ..., 201n), local management unit units (202a, 202b, ..., 202n), an inverter (203), and a system management unit (204).

In one embodiment, the system management unit (204) is part of the inverter (203), the combiner box (206), a local management unit, or a stand-alone unit. The solar modules (201a, 201b, ..., 201n) are connected in parallel to the local management unit units (202a, 202b, ..., 202n) respectively, which are connected in series to form a string bus (205), which eventually is connected to an inverter (203) and the management unit (204).

In FIG. 4, the string bus (205) can be connected to the inverter (203) directly or as part of a mesh network or combiner boxes or fuse boxes (not shown). An isolated local management unit can be used as a combiner box (206) to adjust all voltages before connecting to the inverter (206); or, a single or multi-string inverter can be used. To limit the changes in the voltage of the bus, the management unit (204) may assign a different phase for each of the local management units (202a, 202b, ..., 202n). In one embodiment, at any given time, a maximum of a predetermined number of solar modules (e.g., one single solar module) are disconnected from the string bus (205).

In one embodiment, beyond the module connection the local management units can have the signal inputs, including but not limited to duty cycle (104a), phase (104b) and synchronization pulse (104c) (e.g., to keep the local management units synchronized). In one embodiment, the phase (104b) and the synchronization pulse (104c) are used to further improve performance, but the local management unit (101) can work without them.

In one embodiment, the local management unit may provide output signals. For example, the local management unit (101) may measure current and voltage at the module side and optionally measure current and voltage in the string side. The local management unit (101) may provide other suitable signals, including but not limited to measurements of light, temperature (both ambient and module), etc.

In one embodiment, the output signals from the local management unit (101) are transmitted over the power line (e.g., via power line communication (PLC)), or transmitted wirelessly.

In one embodiment, the system management unit (204) receives sensor inputs from light sensor(s), temperature sensor(s), one or more each for ambient, solar module or both, to control the photovoltaic system (200). In one embodiment, the signals may also include synchronization signals. For example, a management unit can send synchronization signals periodically to set the timing values, etc.

Using the described methods the local management unit can be a very non-expensive and reliable device that can easily increase the throughput of a photovoltaic solar system by a few (e.g., signal or low double digits) percentage points. These varied controls also allow installers using this kind of system to control the VOC (open circuit voltage) by, for example by shutting off some or all modules. For example, by using the local management units of the system, a few modules can be disconnected from a string if a string is getting to the regulatory voltage limit, thus more modules can be installed in a string.

In some embodiments, local management units can also be used within the solar panel to control the connection of solar cells attached to strings of cells within the solar panel.

Figure 5:
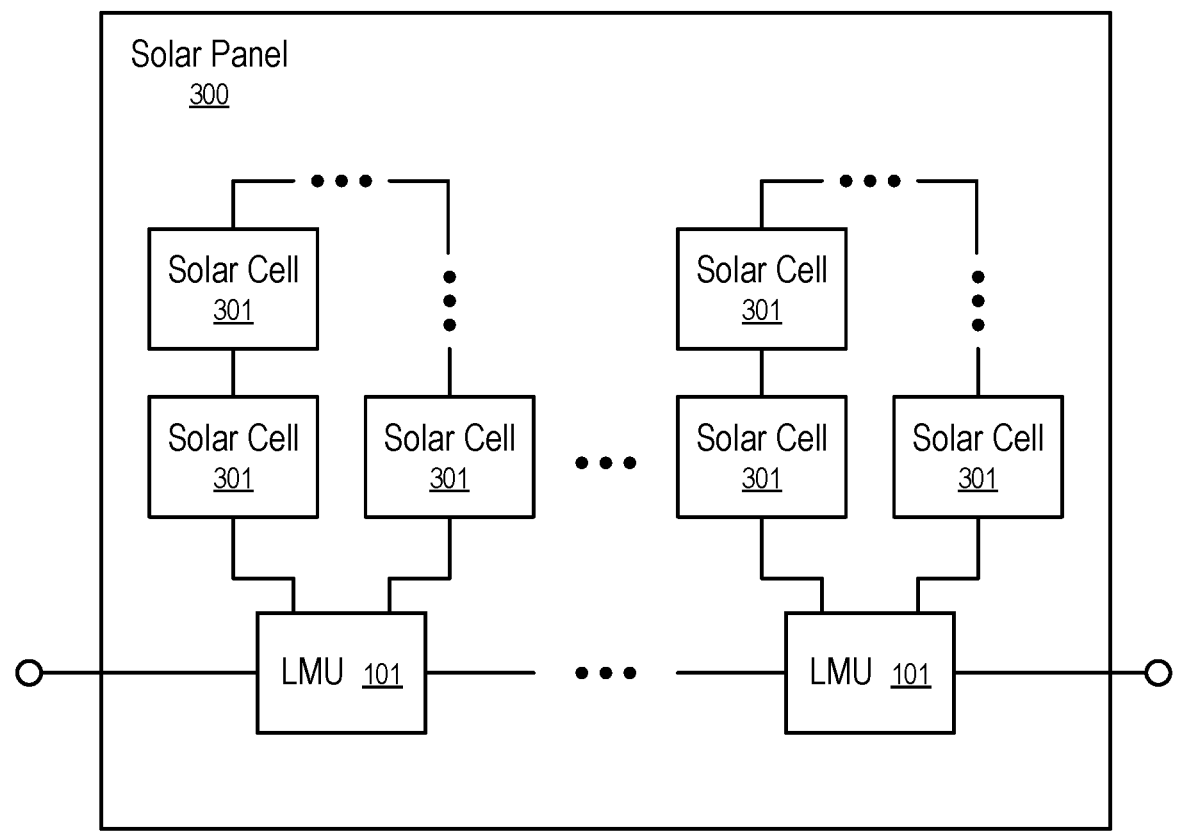
FIG. 5 illustrates a solar panel according to one embodiment.

FIG. 5 illustrates a solar panel according to one embodiment. In one embodiment, the solar panel (300) has a few strings of solar cells (e.g., three solar cell strings per module). In FIG. 5, a local management unit (101) can be applied to a group of cells (301) within a string of an individual solar panel (300), or in some cases to each cell (301) in a solar panel (300).

In FIG. 5, a group of solar cells (301) that are attached to a local management unit (101) may be connected to each other in series, in parallel, or in a mesh configure. A number of local management units (101) connect the groups of the solar cells (301) in a string to provide output for the solar panel (300).

Some embodiments of the disclosure includes methods to determine the duty cycles and/or phases for local management units connected to a string or mesh of solar modules.

In some embodiments, the duty cycle of all local management units in a string or mesh can be changed, to increase or decrease the string voltage. The duty cycles may be adjusted to avoid exceeding the maximum voltage allowed. For example, the maximum voltage may be limited by the combiner box (206), the inverter (203), or any other load connected to the string bus (205), or limited by any regulations applicable to that system. In some embodiments, the duty cycles are adjusted to align the voltage of multiple strings.

In some embodiments, the duty cycle of one local management unit (101) in a string can be changed to cause higher current in that local management unit (101) and overall higher power harvesting.

In one embodiment, the duty cycles are computed for the solar modules that are connected to a string via the corresponding local management units. The duty cycles can be calculated based on the measured current and voltages of the solar modules and/or the temperatures.

After an initial set of duty cycles is applied to the solar modules, the duty cycles can be further fine tuned and/or re-adjusted to changes, such as shifting shading etc., one step a time, to improve power performance (e.g., to increase power output, to increase voltage, to increase current, etc.). In one embodiment, target voltages are computed for the solar modules, and the duty cycles are adjusted to drive the module voltage towards the target voltages.

The methods to compute the duty cycles of the solar modules can also be used to compute the duty cycles of the groups of solar cells within a solar module.

Figure 6:
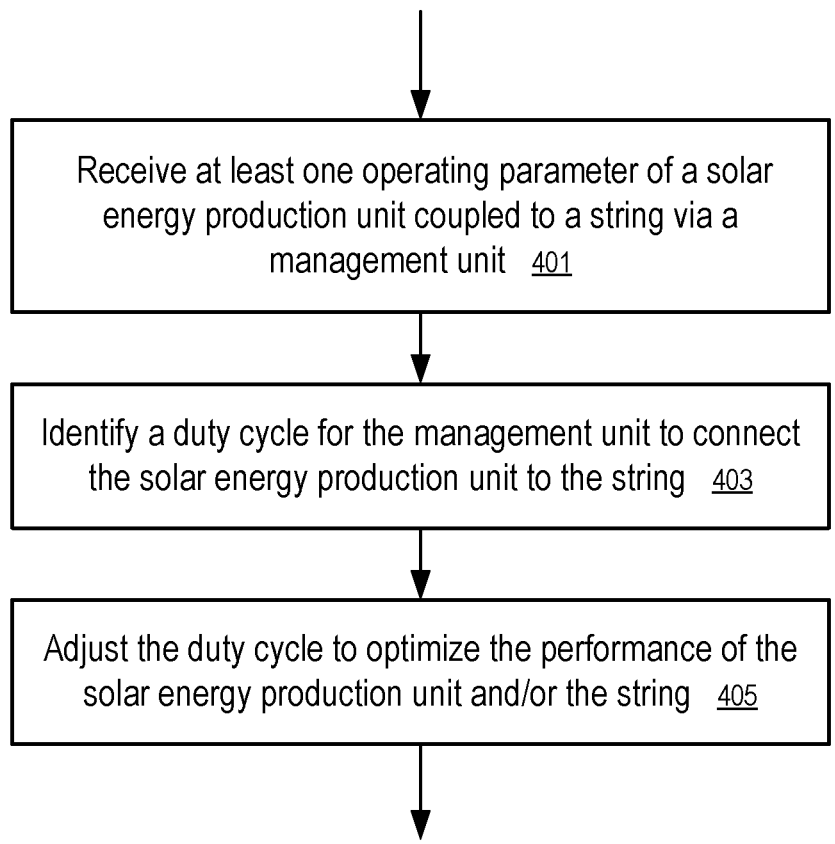
FIGS. 6-8 show methods to improve performance of a photovoltaic system according to some embodiments.
Figure 7:
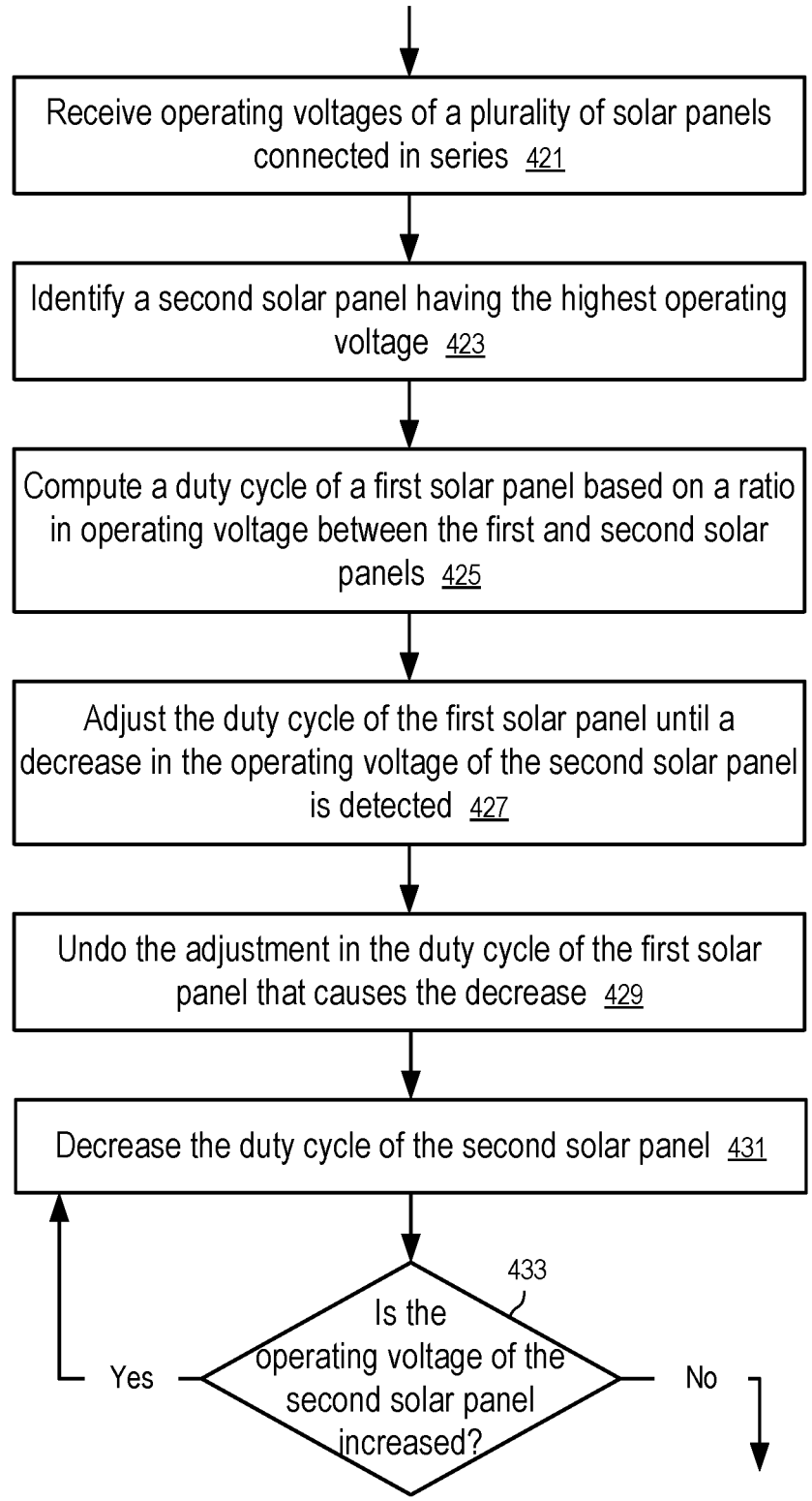
Figure 8:
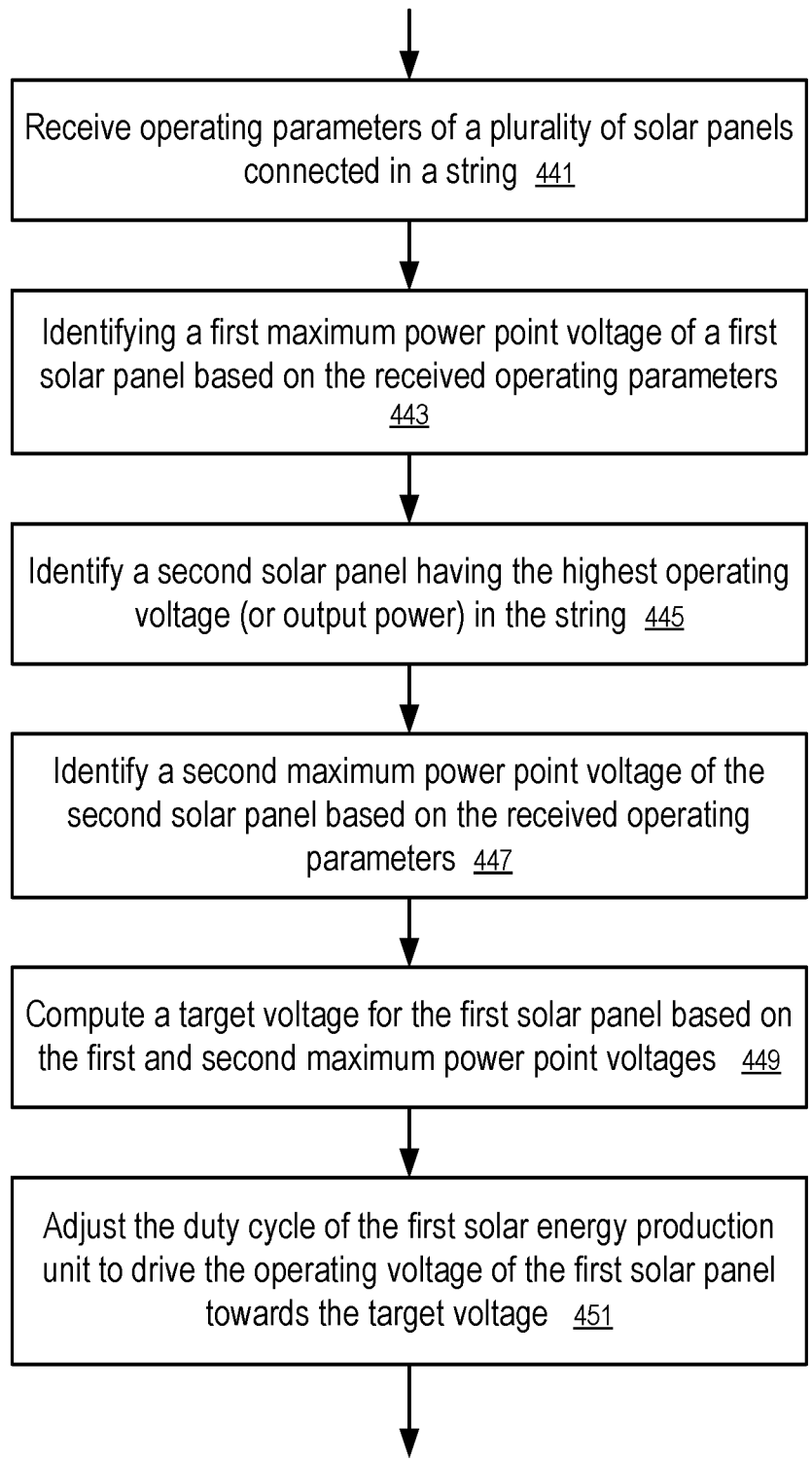

FIGS. 6-8 show methods to improve performance of a photovoltaic system according to some embodiments.

In FIG. 6, at least one operating parameter of a solar energy production unit coupled to a string via a management unit is received (401) and used to identify (403) a duty cycle for the management unit to connect the solar energy production unit to string. The solar energy production unit may be a solar module, a group of solar cells within a solar module, or a single solar cell in a string in a solar module. The duty cycle is adjusted (405) to optimize the performance of the solar energy production unit and/or the string.

For example, the duty cycle can be adjusted to increase the current in the string and/or the solar energy production unit, to increase the output power of the string and/or the solar energy production unit, to increase the voltage of the solar energy production unit, etc.

In FIG. 7, the operating voltages of a plurality of solar panels connected in series are received (421) and used to identify (423) a second solar panel having the highest operating voltage (highest output power) in the string.

In FIG. 7, a duty cycle of a first solar panel is computed (425) based on a ratio in operating voltage between the first and second solar panels. Alternatively, the duty cycle can be computed based on a ratio in output power between the first and second solar panels. Alternatively, the duty cycle can be computed based on a ratio between the first and second solar panels in estimated/computed maximum power point voltage. Alternatively, the duty cycle can be computed based on a ratio between the first and second solar panels in estimated/computed maximum power point power.

The duty cycle of the first solar panel is adjusted (427) to improve the performance of the first solar energy production unit and/or the string, until a decrease in the operating voltage of the second solar panel is detected. For example, the duty cycle of the first solar panel can be adjusted to increase the total output power of the string, to increase the current of the string, to increase the current of the first solar panel, to drive the voltage of the first solar panel towards a target voltage, such as its maximum power point voltage estimated based on its current operating parameters, such as temperature or a voltage calculated using its estimated maximum power point voltage.

In FIG. 7, in response to the detected decrease in the operating voltage of the second solar panel which had the highest operating voltage, the adjustment in the duty cycle of the first solar panel that causes the decrease is undone/reversed (429).

In FIG. 7, the duty cycle of the second solar panel is optionally decreased (431) to increase the operating voltage of the second solar panel. In some embodiments, the strongest solar panel (or strong panels within a threshold from the strongest panel) is not switched off line (e.g., to have a predetermined duty cycle of 100%).

In one embodiment, the duty cycle of the second solar panel is repeatedly decreased (429) until it is determined (431) that the decrease (429) in the duty cycle of the second solar panel cannot increase the voltage of the second solar panel.

In FIG. 8, operating parameters of a plurality of solar panels connected in a string are received (441) and used to identify (443) a first maximum power point voltage of a first solar panel. A second solar panel having the highest operating voltage (or output power) in the string is identified. A second maximum power point voltage of the second solar panel is identified (447) based on the received operating parameters and used to compute (449) a target voltage for the first solar energy production unit. In one embodiment, the target voltage is a function of the first and second maximum power point voltages and the highest operating voltage identified (445) in the second solar panel in the string. The duty cycle of the first solar energy production unit is adjusted to drive the operating voltage of the first solar panel towards the target voltage.

Alternatively, the target voltage may be the set as the first maximum power point voltage of the first solar panel.

In one embodiment, to adjust voltage a same factor is applied to all modules in that string. For example, in a case of a first module A1 that is producing only 80%, and the voltage of the whole string needs to be 5% lower, the duty cycle of A1 is 80% multiplied the duty cycle applied to the whole string (which is Y in this example) so module A1 then has Y×0.8 as duty cycle.

In some embodiments, the system management unit (204) and/or the local management units (e.g., 202a, 202b, . . . , 202n) are used solely or in combination to determine the parameters to control the operations of the switches.

For example, in one embodiment, a system management unit (204) is the "brain" of the system, which decides on the duty cycle and phase parameters.

For example, in another embodiment, each local management unit broadcasts information to the other local management units on the string to allow the individual local management units to decide their own duty cycle and phase parameters.

In some embodiment, a local management unit may instruct one or more other local management units to adjust duty cycle and phase parameters. For example, the local management units on a string bus (205) may elect one local management unit to compute the duty cycle and phase parameters for other local management units on the string.

For example, in some embodiment, the system management unit (204) may determine one or more global parameters (e.g., a global duty cycle, the maximum power on the string, the maximum voltage on the string, etc.), based on which individual local management units adjust their own duty cycles.

In some embodiments, a local management unit may determine its own duty cycles without relying upon communicating with other management units. For example, the local management unit may adjust its duty cycle for connecting its solar module to the string to operate the solar module at the maximum power point.

In one embodiment, module voltage are measured by the local management units in the same string at substantially/approximately the same time and used to identify the strongest solar module. A strongest solar module provides the most power in the string. Since the modules are connected in series, the solar module having the highest module voltage in the string can be identified as the strongest solar module. In some embodiment, the operating voltage and current of the solar module are measured to determine the power of the solar module.

In one embodiment, after the highest module voltage Vm in the string is identified, the duty cycle for each module can be computed as a function of a ratio between the module voltage V of the module and the highest module voltage Vm. For example, the duty cycle for a module can be computed as $1-((Vm-V)/Vm)=V/Vm$.

In one embodiment, the system management (204) may identify the highest module voltage from the module voltages received from the local management units (202a, 202b, . . . , 202n), and compute the duty cycles for the corresponding local management units (202a, 202b, . . . , 202n).

In one embodiment, the local management units (202a, 202b, . . . , 202n) may report their module voltages on the string bus (205) to allow individual local management units (202a, 202b, . . . , 202n) to identify the highest module voltage and compute the duty cycles, without relying upon the system management unit (204).

In one embodiment, one of the local management units (202a, 202b, . . . , 202n) may identify the highest module voltage and/or compute the duty cycles for the other local management units (202a, 202b, . . . , 202n).

In one embodiment, the duty cycles are determined and/or adjusted periodically.

In one embodiment, after the duty cycles for the solar modules on the string are set based on the module voltage ratio relative to the highest module voltage in the string, the duty cycles can be fine-tuned to increase the power performance. The duty cycles can be fine-tuned one step a time, until a decrease of voltage of the module with the highest power is detected. In response to the detected decrease, the last change that caused the decrease can be reversed (undone). The fine tuning of the duty cycles can be used to reach the peak performance point (e.g., for maximum power point tracking).

In one embodiment, after the strongest module is identified, the duty cycles of the solar modules on the string are adjusted until the module with the highest power in the string decrease its voltage. Since decreasing the duty cycle of a solar module decreases the time period the module is connected to the string and thus increases its voltage, the duty cycle of the module with the highest power in the string can be decreased to increase its voltage, in response to the decrease in its voltage caused by the adjustment to the duty cycles of other solar modules on the string. For example, the duty cycle of the module with the highest power in the string can be decreased until its voltage is maximized.

In one embodiment, the local management unit measures module and ambient temperatures for some methods to determine the duty cycles. For example, the operating parameters measured at the local management units (e.g., 202a, 202b, . . . , 202n), such as module temperature, can be used compute the estimated voltages of the solar modules at their maximum power points. For example, a formula presented by Nalin K. Gautam and N. D. Kaushika in "An efficient algorithm to simulate the electrical performance of solar photovoltaic arrays", Energy, Volume 27, Issue 4, April 2002, pages 347-261, can be used to compute the voltage Vmp of a solar module at the maximum power point. Other formulae can also be used. Once the maximum power point voltage Vmp of a solar module is computed or estimated, the duty cycle of the solar module connected to a string can be adjusted to drive the module voltage to the computed/estimated maximum power point voltage Vmp, since decreasing the duty cycle of a solar module normally increases its voltage.

In one embodiment, a local management unit may adjust the duty cycle of the solar module connected to the local management unit to change the module voltage to the computed/estimated maximum power point voltage Vmp, without having to communicating with other management units.

In one embodiment, a local management unit (or a system management unit) may adjust the duty cycle of the solar module connected to the local management unit to perform maximum power point tracking.

In one embodiment, after identifying the strongest module and computing/estimating the maximum power point voltage Vmpm of the strongest module, the duty cycle for each module on a string can be computed as a function of a ratio between the maximum power point voltage Vmp of the module and the maximum power point voltage Vmpm of the strongest module. For example, the duty cycle for a module can be computed as 1−((Vmpm−Vmp)/Vmpm)=Vmp/Vmpm. The duty cycle can be periodically updated, based on the current operating parameters measured, and/or fine tuned until a decrease in the voltage of the strongest module is detected.

Alternatively, a target voltage for each module on the string can be computed as a function of a ratio between the maximum power point voltage Vmp of the module and the maximum power point voltage Vmpm of the strongest module. For example, the target voltage for a module can be computed as Vm×Vmp/Vmpm, where Vm is the measured voltage of the strongest module. The duty cycle of the module can be changed to drive the module voltage of the module towards the target voltage.

In one embodiment, after identifying the strongest module and computing/estimating the maximum power point power Pmpm of the strongest module, the duty cycle for each module on a string can be computed as a function of a ratio between the maximum power point power Pmp of the module and the maximum power point power Pmpm of the strongest module. For example, the duty cycle for a module can be computed as 1−((Pmpm−Pmp)/Pmpm)=Pmp/Pmpm. The duty cycle can be periodically updated, based on the current operating parameters measured, and/or fine-tuned until a decrease in the voltage of the strongest module is detected, since decreasing the duty cycle normally increases the module voltage.

In one embodiment, a target voltage for each module on the string can be computed as a function of a ratio between the maximum power point power Pmp of the module and the maximum power point power Pmpm of the strongest module. For example, the target voltage for a module can be computed as Vm×Pmp/Pmpm, where Vm is the measured voltage of the strongest module. The duty cycle of the module can be changed to drive the module voltage of the module towards the target voltage, since decreasing the duty cycle normally increases the module voltage.

In one embodiment, the duty cycle for each local management unit is changed to increase the current of the solar module attached to the local management unit (e.g., based on the measurement of the voltage and current of the solar module), until the maximum current is achieved. This method assumes that string maximum power can be achieved with some accuracy by driving each local management unit to maximum current. In one embodiment, the voltages and currents of the solar modules are measured for tuning the duty cycles for maximum power point tracking for the string. The measurements of the voltages and currents of the solar modules also enable the local management units to additionally serve as a module level monitoring system.

The duty cycles can be adjusted by the system management unit (e.g., 204) based on the measurements reported by the local management units (e.g., 202a, 202b, . . . , 202n), or adjusted directly by the corresponding local management units (e.g., 202a, 202b, . . . , 202n).

In one embodiment, during the process of setting and/or tuning the duty cycles, the maximum power point tracking operation by the inverter (203) is frozen (temporarily stopped). Light intensity at the solar modules is monitored for changes. When the light intensity at the solar modules stabilizes, the voltage and current of the solar modules are measured for the determination of the duty cycles. Then normal operation resumes (e.g., unfreezing of maximum power point tracking operation).

In one embodiment, the local management units measure the voltages and currents of the solar modules to determine the power of the solar modules. After identifying the highest power Pm of the solar module on the string, the duty cycles of the solar modules on the string are determined by the power radio relative to the highest power Pm. For example, if a module produces 20 percent less power, it will be disconnected from the string bus about 20 percent of the time. For example, if a module produces power P, its duty cycle can be set to 1−((Pm−P)/Pm)=P/Pm.

In one embodiment, a predetermined threshold is used to select the weak modules to apply duty cycles. For example, in one embodiment, when a module produces power less than a predetermine percent of highest power Pm, a duty cycle is calculated and applied to the solar module. If the module is above the threshold, the module is not disconnected (and thus having a duty cycle of 100%). The threshold may be based on the power, or based on the module voltage.

In one embodiment, the system management unit (204) finds the duty cycles for the local management units (202a, 202b, . . . , 202n) and transmits data and/or signals representing the duty cycles to the local management units (202a, 202b, . . . , 202n) via wires or wireless connections. Alternatively, the local management units (202a, 202b, . . . , 202n) may communicate with each other to obtain the parameters to calculate the duty cycles.

In one embodiment, the system management unit (204) knows all the different duty cycles indicated for the local management units (202a, 202b, . . . , 202n).

In one embodiment, during power fine tuning, the system management unit (204) sends the appropriate data/signal to the appropriate local management units (202a, 202b, . . . , 202n), and then the system management unit (204) calculates the total power of the string and corrects the duty cycle to produce maximum power. Once maximum power is achieved, the duty cycles for the local management units (202a, 202b, . . . , 202n) may be saved in a database and serve as a starting point for the corresponding local management units (202a, 202b, . . . , 202n) at the same time of day on the next day. Alternatively, a local management may store the duty cycle in its memory for the next day.

The stored duty cycles can be used when there is a fixed shade on the modules, such as a chimney, a tree, etc., which will be the same shade on any day at the same time. Alternatively, historical data may not be saved, but may be recalculated from scratch on each run, for example every 30 minutes.

In one embodiment, the light intensity at the solar modules is monitored for changes. The duty cycles are calculated when the light intensity does not change significantly. If there are changes in sun light radiation at the solar modules, the system will wait until the environment stabilizes before applying or adjusting the duty cycles.

In one embodiment, the system management unit (204) can communicate with the inverter as well. When the environment is not stable (e.g., when the sun light radiation is changing), the inverter may stop maximum power point tracking. In such a situation, the inverter can be set up for its load, instead of tracking for maximum power point. Instead of using the inverter to perform maximum power point tracking, the system management unit (204) and the local management units (202a, 202b, . . . , 202n) are used to set the operating parameters and balance the string.

Alternatively, when the environment is not stable but measurements and calculation are done faster than the MPPT is working, there may be no need to stop the MPPT on the inverter. Alternatively, when the environment is not stable, measurements can be taken few times for the same radiation until a stable result is achieved.

Many variations may be applied to the systems and methods, without departing from the spirit of the invention. For example, additional components may be added, or components may be replaced. For example, rather than using a capacitor as primary energy store, an inductor may be used, or a combination of inductor and capacitor. Also, the balance between hardware and firmware in the micro controllers or processors can be changed, without departing from the spirit of the invention. In some cases, only some problematic modules may have a local management unit, for example in a shaded or partially shaded or otherwise different situation. In yet other cases, local management units of strong modules may be virtually shut off. The methods for determining the duty cycles for the solar modules can also be used to determine the duty cycles of groups of cells connected via local management units in a string within a solar panel/module.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
a management unit, comprising:
a circuit configured to periodically connect and disconnect a solar module to and from a power bus according to a duty cycle, the duty cycle being adjustable to operate the solar module at a maximum power point; and
a controller configured to receive operating parameters from additional management units coupled to the power bus; and
the additional management units, each of the additional management units configured to determine operating parameters of a respective solar module and transmit the operating parameters of the respective solar module to the controller of the management unit, the controller of the management unit further configured to determine duty cycles for the additional management units based at least in part on the operating parameters received from the additional management units.

2. The system of claim 1, comprising the power bus, wherein the power bus is a serial power bus.

3. The system of claim 2, wherein each of the additional management units has a switch to periodically connect and disconnect a respective solar module to and from the power bus.

4. The system of claim 3, wherein the controller of the management unit is configured to determine different phases for respective switches in the additional management units.

5. The system of claim 2, wherein the operating parameters include at least one of: current, voltage, and temperature.

6. The system of claim 5, wherein the controller of the management unit is configured to calculate estimated maximum power points of solar modules connected on the serial power bus, wherein the duty cycles are determined based on the estimated maximum power points of the solar modules.

7. The system of claim 1, wherein the management unit has only one output to supply electricity generated by the solar module coupled to the circuit.

8. The system of claim 1, wherein the management unit is connected in series with the additional management units of solar modules on the serial power bus.

9. A system, comprising:
a power bus;
a management unit, comprising:
   a circuit configured to periodically connect and disconnect a solar module to and from the power bus according to a duty cycle, the duty cycle being adjustable to operate the solar module at a maximum power point; and
   a controller configured to receive operating parameters from additional management units coupled to the power bus; and
the additional management units, each of the additional management units configured to determine operating parameters of a respective solar module and transmit the operating parameters of the respective solar module to the controller of the management unit, the controller of the management unit further configured to determine duty cycles for the additional management units based at least in part on the operating parameters received from the additional management units.

10. The system of claim 9, wherein the power bus is a serial power bus.

11. The system of claim 9, wherein each of the additional management units has a switch to periodically connect and disconnect a respective solar module to and from the power bus.

12. The system of claim 11, wherein the controller of the management unit is configured to determine different phases for respective switches in the additional management units.

13. The system of claim 9, wherein the operating parameters include at least one of:
current, voltage, and temperature.

14. The system of claim 13, wherein the controller of the management unit is configured to calculate estimated maximum power points of solar modules connected on the power bus, wherein the duty cycles are determined based on the estimated maximum power points of the solar modules.

15. The system of claim 9, wherein the management unit has only one output to supply electricity generated by the solar module coupled to the circuit.

16. The system of claim 9, wherein the management unit is connected in series with the additional management units on the power bus.

17. A system, comprising:
a management unit, comprising:
   a circuit configured to periodically connect and disconnect a solar module to and from a power bus according to a duty cycle, the duty cycle being adjustable to operate the solar module at a maximum power point; and
   a controller configured to receive operating parameters from additional management units coupled to the power bus; and
the additional management units, each of the additional management units configured to determine operating parameters of a respective solar module and transmit the operating parameters of the respective solar module to the controller of the management unit, the controller of the management unit further configured to determine duty cycles for the additional management units based at least in part on the operating parameters received from the additional management units, and the management unit being connected in series with the additional management units on the power bus.

18. The system of claim 17, comprising the power bus, wherein the power bus is a serial power bus.

19. The system of claim 17, wherein each of the additional management units has a switch to periodically connect and disconnect a respective solar module to and from the power bus.

20. The system of claim 19, wherein the controller of the management unit is configured to determine different phases for respective switches in the additional management units.

* * * * *